3,426,997
RELIEF VALVE CONSTRUCTION
Robert Dale Vanderlaan, Kalamazoo, Mich., assignor to Pneumo Dynamics Corporation, Cleveland, Ohio, a corporation of Delaware
Filed Dec. 14, 1966, Ser. No. 601,798
U.S. Cl. 251—120                                6 Claims
Int. Cl. F16k 17/08, 17/168, 1/54

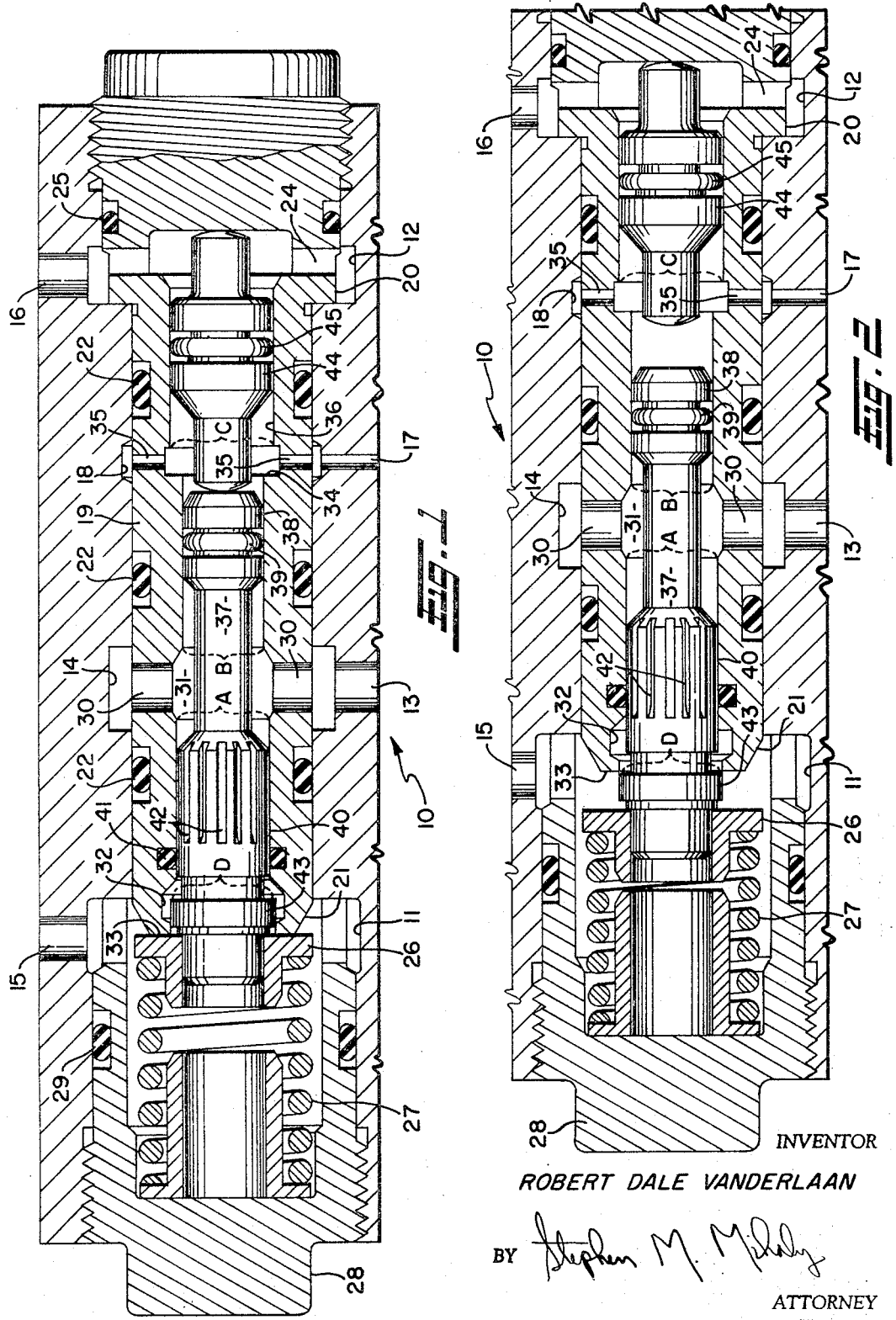

This invention relates, as indicated, to relief valves and has for a primary object the provision of an improved relief valve with zero leakage in ultra-high pressure applications.

A further object is to provide such a valve in which resilient seals are employed to achieve the zero leakage characteristic and the construction is such that these seals are afforded positive protection against erosive action thereon by the high velocity fluid flow resulting in the operation of the valve.

It is another object of the invention to provide such a relief valve design in which the seal means is pressure balanced after the fluid flow begins, with only minimum initial squeeze friction existing while metering and valve hysteresis thereby reduced.

It is a still further object to provide an ultra-high pressure relief valve as set forth having improved flow characteristics, including the development of an additional opening force as the valve opens which aids, for example, in counteracting force build-up in the regulating spring which biases the valve closed.

An additional object of the invention is to provide relief valve construction on the order indicated having a lock-out feature incorporated by means for the application of a secondary control pressure, whereby equalization of the pressures compared in the valve can be achieved if desired in addition to the normal relief function.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a longitudinal section of a relief valve with lock-out provision in accordance with the present invention, with the valve here shown in closed condition; and FIG. 2 is a similar longitudinal section in which the valve is shown actuated to its open condition.

Referring now to the drawing in detail, the structure designated by reference numeral 10 represents a section of an environmental housing in which there is a bore the end sections 11, 12 of which are relatively enlarged and internally threaded. A first housing passage or port 13 provides communication to the portion of the bore intermediate the end portions, through an annular relief 14 in the wall of the former, while further passages 15 and 16 communicates respectively with the enlarged end portions 11, 12 adjacent the inner ends of the same. The housing is also shown provided with a vent 17 from another annular recess 18 in the wall of the intermediate portion of the bore between the recess 14 and the end portion 12.

The valve assembly comprises a sleeve 19 received within the intermediate portion of the bore, with this sleeve insertable through the end portion 12 and having a stop flange 20 at one end. It will be appreciated that the other end 21 of the sleeve, which is externally beveled, is first inserted and projects as shown beyond the corresponding end of the intermediate bore section or into end section 11 with full insertion and the stop engagement of the other end flange. The sleeve is sealed to the bore by three axialy spaced packings 22, such as O-rings, and a sleeve retainer 23 having inner end lugs 24 is threaded into the end portion 12 to advance such lugs against the sleeve end flange 20, with a further O-ring 25 sealing the periphery of this retainer.

Within the other end portion 11 of the bore, there is an annular spring guide 26 shown in FIG. 1 as bearing against the sleeve end 21, a helical compression spring 27 engaging the guide, and a spring retainer 28 threaded in the bore against the other end of the spring. This spring retainer is sealed within the bore by another O-ring 29.

The sleeve 19 is provided with a series of radial passages 30 in its wall in register with the main annular relief 14, with the inner surface of the sleeve at this section 31 being relatively relieved and the internal diameter indicated at A to the left of this section in the illustrated view being greater than the diameter B at the other side. The section having the diameter A extends to a further wall relief 32 of relatively short axial extent near the sleeve end 21 where an annular lip 33 is formed at a diameter which is larger than the diameter A. At the other side of the intermediate section of this sleeve, the section at the diameter B extends to a relief 34 in register with the annular vent port 18, with further radial passages 35 in the sleeve providing communication therebetween, and the remaining section 36 of the sleeve is relatively enlarged at a diameter C, which is greater than the diameter A, the significance of these dimensional relationships to be explained hereinbelow.

A close fitting valve plunger 37 is received within the sleeve and extends from the diameter B section beyond the other sleeve end 21. Such plunger has an enlarged end 38 sealed by an O-ring 39 to the sleeve diameter B, and a body portion 40 closely fitted in the diameter A section near the outer end of which there is an O-ring 41 in an annular groove for sealing engagement with the plunger body portion. This portion is provided with a series of longitudinal slots 42 having unobstructed inner ends and being of such length that the outer ends are to the inside of the seal 41 in the closed condition of the valve shown in FIG. 1 and displaced outward of such seal with opening of the valve. It will accordingly be evident that such closed condition maintains a resilient seal between the ports 13 and 15, while fluid can flow in both directions therebetween through the longitudinal slots and across the seal with the valve open. The extreme end of the plunger 37 bears against the spring guide 26 and, at a small inward spacing, there is a flange 43 formed on the plunger at a diameter D which is slightly less than that of the lip 33 but greater than the diameter A. As evident from a comparison of the two figures, this flange 43 moves in the opening of the valve through the lip 33 to a close-spaced outer position.

As indicated in the foregoing, the new valve is basically designed for pressure relief, and the thus far described assembly of the valve plunger 37, the regulating spring 27, and those portions of the valve sleeve and housing associated with the former will be seen to provide such a function. The port 13 can be assumed to be connected to a device in which pressure is to be relieved, for example, a fluid-powered cylinder, with a return to the fluid source from the port 15. The resilient seal ring 41 provides the desired zero leakage characteristic, and when the cylinder pressure increases sufficiently to move the plunger against the spring, with this direction of movement resulting from the fact that the diameter A is greater than the diameter B, and the slots 42 move through this ring, the resulting fluid flow is established through the gap defined by the closely opposed edges of the sleeve end lip 33 and the plunger flange 43 with metering effect.

This last metering effect constitutes a restriction to the flow which is significantly greater than that constituted by the slots 42 bridging the seal 41, with the result that the high flow velocities occur at the secondary diameter D rather than at such seal ring. Seal ring 41 is, of course, supported by the portions of the plunger body 40 between the slots, and the metering at the flange 43 will also be seen to restrict the flow by the seal until it becomes pressure balanced, with the valve thereafter metering on the edge of the flange at diameter D after the slots are substantially open.

Without the noted metering effect, it was found that relatively high flow rates over the seal 41, together with the high pressures used, tended to push the seal into the slots 42 with consequent failure due to the erosive and arbasive action on the seal occuring when the pressure reached 1,000 p.s.i. The protection afforded by the noted metering in the new design eliminated such seal failure in testing with pressures as high as 12,000 p.s.i. It will be further appreciated that with the flange diameter D slightly larger than the plunger sealing diameter A, there will be developed an additional opening force on the plunger 37 as the valve begins to open, with this supplemental force aiding in counteracting buildup of the opposing force of the spring 27.

In some applications, it may be desired to make provision for opening of the valve at input or cylinder pressures less than the value established for relief, for example, to equalize the pressures compared, and this function can be realized most simply by providing for the application of a secondary control pressure at the remote end of the valve plunger 37, in which case the design would be that of a normally closed lock-out with a pressure relief feature. A further refinement along this line is shown in the illustrated embodiment as provided by an actuating piston 44 in the sleeve section at diameter C at the end of the valve plunger 37 and between the vent 17 and the further port 16. The piston is sealed to the sleeve by an O-ring 45, and it will be understood that the space between the piston and the plunger is vented to the atmosphere through the vent port 17. Since the effective area of the piston at diameter D is greater than that of the plunger at diameter B, the ports 15 and 16 can be interconnected and controlled, for example, by a three-way valve, not shown. With the ports 15 and 16 thus at return pressure, the usual relief of the cylinder pressure at port 13 will be provided, while by applying a predetermined pressure to the ports 15, 16 through such a valve, the plunger can be moved to the open condition for pressure equalization regardless of the value of the cylinder pressure.

Other modes of applying the principle of the invention may be employed, change being made as regards the details described, provided the features stated in any of the following claims or the equivalent of such be employed.

I, therefore, particularly point out and distinctly claim as my invention:

1. Valve construction comprising sleeve means forming a through passage for pressure fluid flow, a valve plunger closely fitted in and being movable axially relative to the sleeve means, one of said sleeve means and plunger having an annular recess, a resilient seal ring in said recess, the other of said sleeve means and plunger having a body portion engaged by said ring in such relative movement for sealing the passage, said body portion being provided with a series of longitudinal grooves in circumferential spaced relation which in a closed condition of the valve construction are completely to one side of the ring and are relatively moved upon opening to bridge the ring, whereby fluid is permitted to flow through the grooves past the seal ring while the latter is supported by the body portions between the grooves, and flow-restricting means at a location spaced from the seal ring and having more restrictive effect than the body grooves, thereby to protect the ring against high flow erosive action.

2. Valve construction as set forth in claim 1, wherein the flow-restricting means comprises cooperable surfaces defining an annular opening the internal diameter of which is greater than that of the seal ring.

3. Valve construction as set forth in claim 2, wherein one of said surfaces is a wall section of the sleeve means at the side of the seal ring opposite that at which the grooves are disposed in the closed condition, and the other of such surfaces is formed on the valve plunger and partakes of the relative movement thereof.

4. Valve construction as set forth in claim 1, wherein the relative movement of the plunger in the direction of opening is resiliently opposed by biasing means.

5. Valve construction as set forth in claim 4, wherein the sleeve means has first port means for connection to a source of fluid to be relieved when the pressure thereof exceeds a predetermined value, and second port means for applying a secondary control pressure to produce opening relative movement of the plunger at source pressures lower than said value.

6. Valve construction as set forth in claim 5, wherein piston means is associated with the valve plunger and the second port means for actuating the former in response to such secondary control pressure.

References Cited

UNITED STATES PATENTS 2,890,715  6/1959  Ebersold _____ 137—522

WILLIAM F. O'DEA, *Primary Examiner.*

HOWARD M. COHN, *Assistant Examiner.*

U.S. Cl. X.R.

137—522, 614.18